United States Patent
Charles

(10) Patent No.: US 10,747,669 B2
(45) Date of Patent: Aug. 18, 2020

(54) PREFETCHING DATA

(71) Applicant: Arm Limited, Cambridge (GB)

(72) Inventor: Simon Alex Charles, Cambridge (GB)

(73) Assignee: ARM Limited, Cambridge (GB)

( * ) Notice: Subject to any disclaimer, the term of this patent is extended or adjusted under 35 U.S.C. 154(b) by 32 days.

(21) Appl. No.: 16/120,025

(22) Filed: Aug. 31, 2018

(65) Prior Publication Data

US 2019/0073308 A1    Mar. 7, 2019

(30) Foreign Application Priority Data

Sep. 5, 2017    (GB) .................................. 1714268.8

(51) Int. Cl.
*G06F 12/0862*    (2016.01)
*G06F 12/0897*    (2016.01)
(Continued)

(52) U.S. Cl.
CPC ...... *G06F 12/0862* (2013.01); *G06F 12/0897* (2013.01); *G06F 12/0888* (2013.01); *G06F 2212/1024* (2013.01); *G06F 2212/455* (2013.01); *G06F 2212/602* (2013.01); *G06F 2212/6022* (2013.01);
(Continued)

(58) Field of Classification Search
CPC ............. G06F 12/0862; G06F 12/0897; G06F 12/0888; G06F 2212/1024; G06F 2212/455; G06F 2212/602; G06F 2212/6022; G06F 2212/6028; G06T 1/20; G06T 1/60
See application file for complete search history.

(56) References Cited

U.S. PATENT DOCUMENTS 6,247,107 B1 *   6/2001  Christie .............. G06F 12/0215
                                                        711/137
2004/0196281 A1   10/2004  Huang
(Continued)

OTHER PUBLICATIONS

Sair et al "A Decoupled Predictor-Directed Stream Prefetching Architecture" IEEE Transactions on Computers vol. 52 Issue 3, Mar. 2003 p. 260-276 Retrieved from the Internet. [Retrieved on Oct. 24, 2019] <URL: https://sites.cs.ucsb.edu/~sherwood/pubs/ToC-pdsb.pdf> (Year: 2003).*

(Continued)

*Primary Examiner* — David Yi
*Assistant Examiner* — Dustin B. Fulford
(74) *Attorney, Agent, or Firm* — EIP US LLP

(57) ABSTRACT

A method of prefetching attribute data from storage for a graphics processing pipeline comprising a cache, and at least one buffer to which data is prefetched from the storage and from which data is made available for storing in the cache. The method comprises retrieving first attribute data from the storage, the first attribute data representative of a first attribute of a first vertex of a plurality of vertices of at least one graphics primitive, identifying the first vertex, and, in response to the identifying, performing a prefetch process. The prefetch process comprises prefetching second attribute data from the storage, the second attribute data representative of a second attribute of the first vertex, the second attribute being different from the first attribute, and storing the second attribute data in a buffer of the at least one buffer.

20 Claims, 11 Drawing Sheets

(51) Int. Cl.
  *G06F 12/0888* (2016.01)
  *G06T 1/20* (2006.01)
  *G06T 1/60* (2006.01)

(52) U.S. Cl.
  CPC ........ *G06F 2212/6028* (2013.01); *G06T 1/20* (2013.01); *G06T 1/60* (2013.01)

(56) References Cited

U.S. PATENT DOCUMENTS

| | | |
|---|---|---|
| 2006/0209078 A1 | 9/2006 | Anderson et al. |
| 2010/0268921 A1 | 10/2010 | Preble |
| 2013/0275679 A1 | 10/2013 | Goldberg et al. |
| 2016/0196633 A1 | 7/2016 | Charles |

OTHER PUBLICATIONS

Norman P. Jouppi; "Improving Direct-Mapped Cache Performance by the Addition of a Small Fully-Associative Cache and Prefetch Buffers"; Mar. 1990; Digital Equipment Corporation Western Research Lab.
United Kingdom Search Report dated Jun. 29, 2018 on related United Kingdom application No. GB 1714268.8 filed Sep. 5, 2017.
United Kingdom Combined Search and Exam Report dated Feb. 23, 2018 on related United Kingdom application No. GB 1714268.8 filed Sep. 5, 2017.

\* cited by examiner

PREFETCHING DATA

CROSS-REFERENCE TO RELATED APPLICATIONS

This application is claims priority to United Kingdom Application No. GB 1714268.8, filed Sep. 5, 2017 under 35 U.S.C. § 119(a). Each of the above-referenced patent applications is incorporated by reference in its entirety.

BACKGROUND OF THE INVENTION

Technical Field

The present invention relates to prefetching data from storage, for example data for use in a graphics processing pipeline.

Background

It is known to prefetch data from a main memory before the prefetched data is needed. The prefetched data is typically stored in a buffer until it is required. The prefetched data may be retrieved from the buffer more quickly than from the main memory, as the buffer is typically faster to access than the main memory. Thus, prefetching of data may be used to hide the latency of a storage system.

BRIEF DESCRIPTION OF THE DRAWINGS

Further features will become apparent from the following description, given by way of example only, which is made with reference to the accompanying drawings.

DETAILED DESCRIPTION OF CERTAIN INVENTIVE EMBODIMENTS

Figure 1:
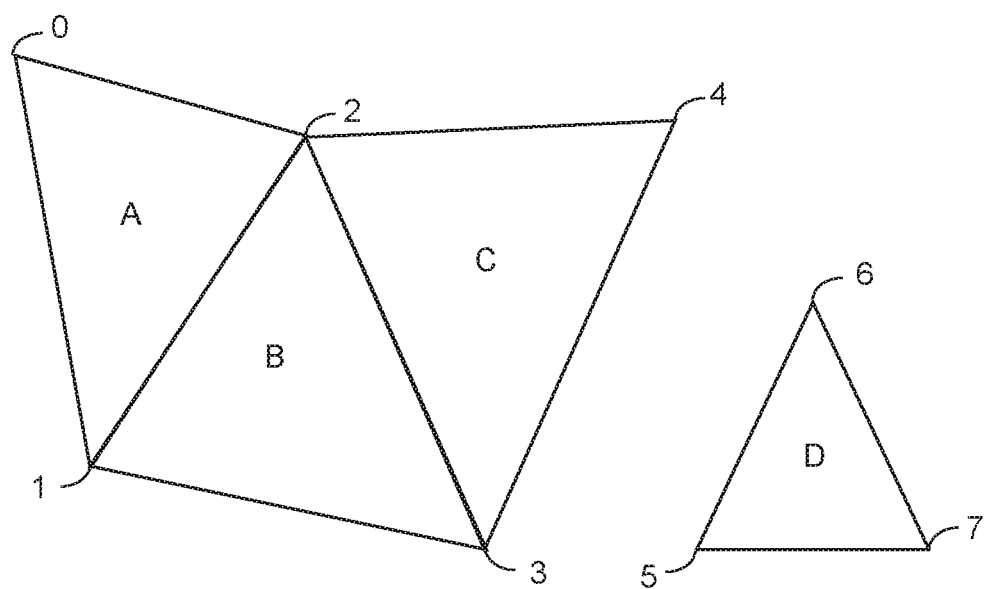
FIG. 1 shows schematically an example of graphics primitives for use in a graphics processing pipeline.

Details of systems and methods according to examples will become apparent from the following description, with reference to the FIGS. In this description, for the purpose of explanation, numerous specific details of certain examples are set forth. Reference in the specification to "an example" or similar language means that a particular feature, structure, or characteristic described in connection with the example is included in at least that one example, but not necessarily in other examples. It should further be noted that certain examples are described schematically with certain features omitted and/or necessarily simplified for ease of explanation and understanding of the concepts underlying the examples.

Examples described herein provide a method of prefetching attribute data from storage for a graphics processing pipeline including a cache and at least one buffer to which data is prefetched from the storage and from which data is made available for storing in the cache. The storage is for example a main memory or a system memory, which is typically slower to access than the cache or the at least one buffer. For example, the cache and/or the at least one buffer may be a smaller or faster memory, located closer to a processor than the storage.

The method in examples includes retrieving first attribute data from the storage. The first attribute data is representative of a first attribute of a first vertex of a plurality of vertices of at least one graphics primitive. The first vertex is identified and, in response to the identifying, a prefetch process is performed. The prefetch process includes prefetching second attribute data from the storage. The second attribute data is representative of a second attribute of the first vertex, different from the first attribute. The second attribute data is stored in a buffer of the at least one buffer.

Prefetching typically involves speculatively fetching what is hoped to be the next or a later entry in a data stream. The prefetched data is stored in a buffer, where it can be retrieved and stored in a cache or used by other components of a processing system more rapidly than from a main memory. For example, by prefetching data of the data stream ahead of the time the data is needed, the data can be accessed rapidly from the buffer without introducing a delay that would be introduced if the data was instead fetched from the main memory rather than the buffer.

However, it can be difficult to predict which data to be prefetch, as often the access pattern or order in which data is accessed or requested varies at random or is hard to quantify or model. In other words, the exact order of the data in the data stream used by the processing system may not be known.

Prefetching data to a buffer and then not subsequently using the prefetched data in the processing system or pipeline generally wastes computing resources by processing and transferring data between memories unnecessarily. Furthermore, if the incorrect data is prefetched and stored in the buffer (for example, data that is not later used as part of the processing pipeline) rather than data that is subsequently needed, the data that is subsequently needed must for example be fetched from the main storage if it is missing from the cache. This is typically slower than fetching data from the cache, and can for example mean that the prefetching does not adequately hide the latency of the memory system.

In examples described herein, the prefetching of the second attribute data is in response to, for example triggered or initiated by, the retrieval of the first attribute data from the storage. Once it is known that the first attribute data for the first vertex of a graphics primitive has been requested for use as part of a graphics processing pipeline, it may be inferred that the second attribute data for the same vertex (in this case, the first vertex) is also likely to be needed by the graphics processing pipeline. This is because the first and second attribute data are both associated with the same vertex and, typically, if characteristics of the first vertex are accessed (for example if the first vertex is processed as part of a graphics processing pipeline) often multiple different attributes of the first vertex will also be requested as part of the graphics processing pipeline. Thus, it is more likely that the second attribute data will also be requested as part of the graphics processing pipeline. Hence, the efficiency of the prefetch process may be improved.

Furthermore, by prefetching the second attribute data and storing it in the buffer, the second attribute data can be retrieved from the buffer rather than from the storage when it is required by the cache (for example where there has a been a so-called "cache miss", in which the second attribute data is not present in the cache). This is typically much faster than retrieving the second attribute data from the storage. Hence, the latency of the memory system may be more successfully hidden or disguised from users of the memory system.

Further examples described herein provide a method of prefetching data from storage for a data processing system including a cache and at least one buffer to which data is prefetched from the storage and from which data is made available for storing in the cache. The method in these further examples includes retrieving first data from the storage and, in response to the retrieving, performing a prefetch process including prefetching second data from the storage, storing the second data in a first buffer, prefetching third data from the storage and storing the third data in a second buffer different from the first buffer.

With these further examples, by prefetching multiple sets of data in response to retrieving the first data from the storage, the likelihood of correctly predicting subsequent entries in a stream of data requested by the cache may also be increased, increasing the efficiency of the prefetching method. For example, the first data may belong to a first data stream, the second data may belong to a second data stream and the third data may belong to a third data stream. There may for example be a relationship between the first, second and third data streams, such that if data from the first data stream is requested, it is more likely that data from the second and/or third data streams will also be required at a later stage. Thus, by prefetching the second and third data and storing it in the buffer, the second and third data will be ready for retrieval by the cache when needed, rather than from the storage, allowing the second and third data to be retrieved more rapidly.

Before methods such as these are described in more detail, a schematic example of graphics primitives for use in a graphics processing pipeline will be described with reference to FIG. 1. FIG. 1 shows an example set of graphics primitives A, B, C, D (which in this example are triangles). Graphics primitives are for example polygons or other geometric shapes that are generated by an application programming interface for a graphics processing system for implementing the graphics processing pipeline. Graphics primitives are typically generated in response to graphics drawing instructions or requests received from an application, such as a game, executing on a host processor (such as a central processing unit or CPU), that requires a graphics output.

Each of the graphics primitives A, B, C, D has a set of vertices, which are labelled from 0 to 7 in FIG. 1. A variety of different arrangements or associations between the graphics primitives A, B, C, D and the vertices are possible. For example, the graphics primitive A has vertices 0, 1, 2. Vertex 0 is associated solely with graphics primitive A, whereas vertices 1 and 2 are shared between graphics primitives A and B, as graphics primitives A and B have a common edge joining vertices 1 and 2. Similarly, vertices 2 and 3 are shared between, and are associated with, both graphics primitives B and C, whereas vertex 4 is associated solely with graphics primitive C. The graphics primitive D is isolated from the other graphics primitives A, B, C and therefore the vertices 5, 6, 7 are associated uniquely with graphics primitive D and are not associated with the other graphics primitives shown in FIG. 1. As will be appreciated, though, the graphics primitives of FIG. 1 are merely illustrative and many other arrangements are possible in other examples.

In examples such as FIG. 1, each vertex has attribute data associated with it. Attribute data for example represents characteristics or features of the corresponding vertex, such as position, colour or texture. There may be attribute data representative of a plurality of different attributes associated with each vertex. For example, a first vertex of a graphics primitive may be associated with first attribute data representative of a first attribute of the first vertex (such as a position of the first vertex or a texture coordinate associated with the first vertex) and second attribute data representative of a second attribute of the first vertex (such as a colour of the first vertex). Thus, the second attribute may be different from the first attribute. The attribute data may be used for rasterizing and rendering the graphics primitives to generate the graphics output. The graphics output may be displayed on a display device coupled to or in communication with the host processor on which the application is executed.

In order to generate the graphics output, the graphics processing pipeline may involve calculating the attributes of sampling points that are located within an output area corresponding to a particular graphics primitive. The attributes of each sampling point, such as characteristics of features of the sampling point such as its colour or texture, can be generated using the attribute data. Typically, the sampling point does not correspond to a vertex of the graphics primitive. Hence, the attributes of a particular sampling point may be calculated using interpolation, such as linear interpolation, of the attribute data for the vertices of the graphics primitive corresponding to the output area within which the sampling point is located.

To improve the speed of the graphics processing pipeline, attribute data may be stored in a cache rather than in the storage of a graphics processing system (such as the main memory or system storage). The cache is for example local storage of a graphics processor or graphics processing unit (GPU), so that data can be accessed rapidly by the graphics processor, with lower power consumption than for accessing data from the main memory.

Attribute data may also be stored in at least one buffer of the graphics processing system. A buffer is for example a storage or memory for storing data temporarily, while it is being moved from one location to another, such as from one storage to another. For example, the at least one buffer may store prefetched attribute data retrieved from the storage (which is for example a main memory or system storage). The prefetched attribute data may then be transferred to the cache, or to other components of a graphics processing system, when required.

As it can be difficult to predict the attribute data that may be needed as part of the graphics processing pipeline, the at least one buffer allows prefetched attribute data to be stored for a limited period of time in case the prefetched data is needed. However, if the prefetched attribute data is not needed within a certain time period, the prefetched attribute data may be evicted from the at least one buffer to make space for other prefetched attribute data.

Further details of a storage system according to examples are given below with reference to FIG. 11.

Figure 2:
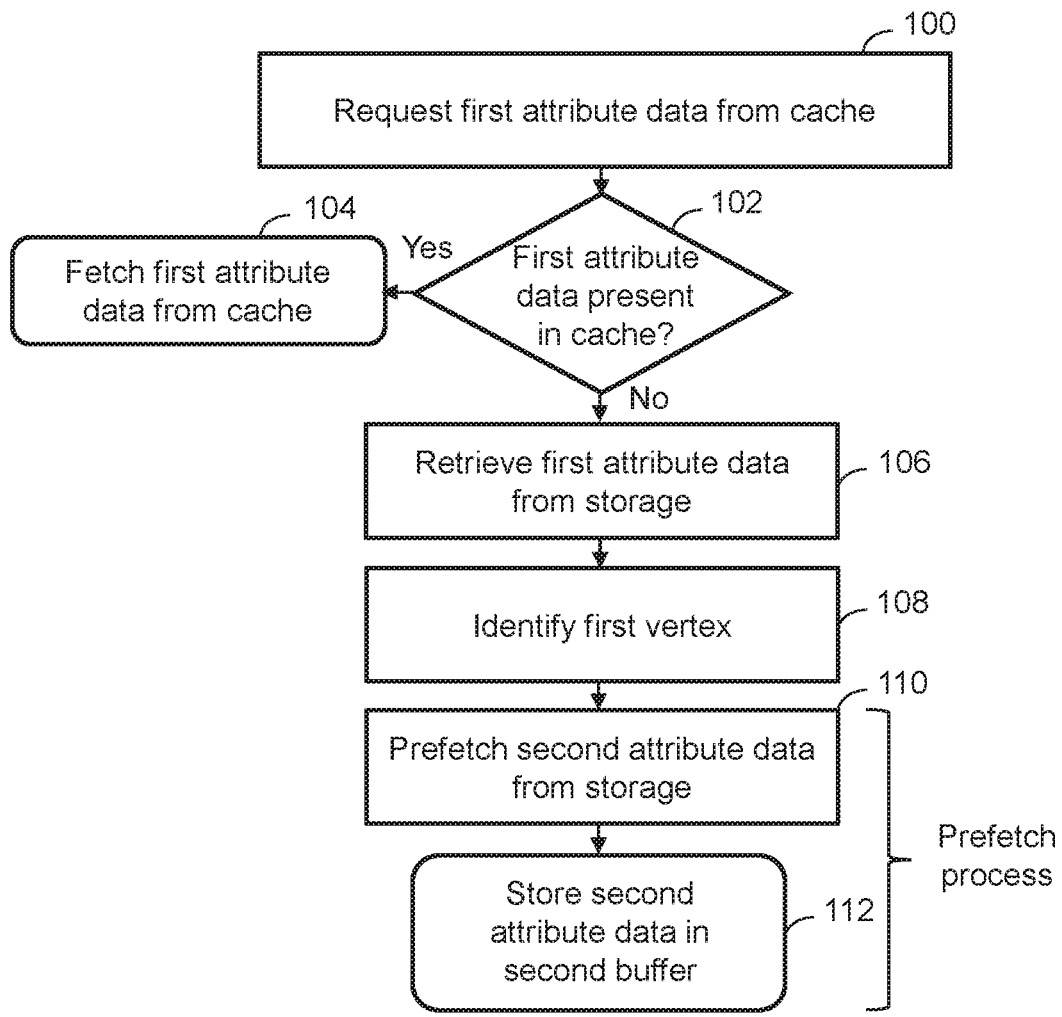
FIG. 2 is a flow diagram illustrating an example method of prefetching attribute data according to examples.

An example of prefetching of attribute data is illustrated schematically in the flow diagram of FIG. 2. At block 100, there is a request for first attribute data from a cache. The request may for example be in the form of instructions to perform a particular graphics processing operation. The first attribute data is representative of a first attribute of a first vertex of a plurality of vertices of at least graphics primitive, such as a vertex of one of the graphics primitives A, B, C, D shown in FIG. 1. The request for the first attribute data may be for example so that the first attribute for a sampling point within a graphics primitive associated with the first vertex can be calculated, for example using interpolation. For example, the request for the first attribute data may be received from an application program that requires a graphics output including the graphics primitive associated with the first vertex. The request may be in the form of an attribute index associated with the first attribute and a vertex index associated with the first vertex. The vertex index may for example be associated with a particular vertex of a graphics primitive of the graphics output by the portion of the graphics processing pipeline that assembles the geometry. However, this example is merely illustrate; in other examples, identifiers for fetching the first attribute data for the first vertex may be received differently.

At block 102, the method involves determining whether the first attribute data is present in the cache. If the first attribute data is present in the cache, the first attribute data is fetched or retrieved from the cache (at block 104) and transferred to another component of the graphics processing system, such as the graphics processor, for further processing based on the instructions received at the cache.

Conversely, at block 106, if it is determined that the first attribute data is absent from the cache, the first attribute data is retrieved from the storage, which is for example the main memory or system storage of the graphics processing system. Determining that the first attribute data is absent from the cache may be referred to as a cache miss, which is for example a failed attempt to read the first attribute data from the cache. In cases in which a cache miss occurs, the missing data (in this example, the first attribute data) may be retrieved from a different memory (in this example, the storage). This can introduce latency in the graphics processing system, slowing down the graphics processing pipeline.

However, in the example of FIG. 2, the method also involves, at block 108, identifying the first vertex, which is the first vertex the first attribute data is associated with. Identifying the first vertex for example allows second attribute data associated with the same vertex as the first attribute data to be prefetched. Thus, the identifying the first vertex may involve any process or step by which the first vertex is identified sufficiently to allow the second attribute data associated with the same vertex as the vertex for which the first attribute data has been fetched to be prefetched. For example, the first vertex may be identified implicitly by prefetching the second attribute data with the same vertex index (in other words, associated with the same vertex) as the first attribute data.

In response to identifying the first vertex, a prefetch process is performed, which can reduce the latency of the graphics processing system in the future. The prefetch process in FIG. 2 involves, at block 110, prefetching second attribute data from the storage, the second attribute data representative of a second attribute of the first vertex, the second attribute being different from the first attribute. At block 112, the second attribute data is stored in a buffer of the at least one buffer.

The identifying the first vertex and the prefetch process may form part of a cache lookup process that may be performed by processor circuitry such as a graphics processor. For example, the cache lookup process may include receiving an identifier allowing the second attribute data to be prefetched. The identifier may for example include an attribute index associated with the second attribute and a vertex index associated with the first vertex. Thus, by virtue of receiving the identifier including a vertex index associated with the first vertex, the first vertex may be considered to be identified as described above, in that the first vertex is sufficiently identified to allow the second attribute data associated with the first vertex to be prefetched. The identifier may also include further data that may be used to identify descriptors (described below), which can be used in conjunction with the attribute and vertex indices to calculate the address of the second attribute data for the first vertex in the storage. For example, the identifier may include a context identifier to allow the processor circuitry to run multiple jobs at the same time, which may require different descriptors.

The prefetch process therefore involves pre-emptively fetching the second attribute data before it is determined that the second attribute data is missing from the cache (in other words, before there is a cache miss for the second attribute data). This method therefore prefetches the second attribute data based on the first attribute data being retrieved from the storage. Thus, the method will for example be more efficient in cases in which the second attribute data is subsequently found to be missing from the cache, as the second attribute data can be fetched from the buffer rather than the storage, which is typically faster.

In this method, the relationship between the first attribute and the second attribute is leveraged to predict data for prefetching. The method assumes, for example, that where the first attribute data is requested for the first vertex, it is likely that the second attribute data for the first vertex will also be requested at a later time. Thus, by prefetching the second attribute data to the buffer for temporary storage, the second attribute data is ready to be supplied from the buffer to the cache when it is requested by the cache. In contrast, if the second attribute data for the first vertex is not prefetched in this way, the second attribute data must be retrieved from the storage rather than from the buffer if it is needed by the cache, which typically takes longer and is less efficient.

The first attribute data may be considered to belong to a first data stream and the second attribute data may be considered to belong to a second data stream different from the first data stream. Thus, the prefetch process in examples involves prefetching data from a different data stream than the data stream for which there has been a cache miss (or for which data is retrieved from the storage). There are typically relatively few different attributes but a large number of different vertices. Thus, in order to avoid a large number of different data streams (which may be more difficult to manage and process), each different attribute may be considered to correspond to a different data stream. Thus, each data stream for a particular attribute will include the value of that attribute for a number of different vertices. Thus, the method in examples such as FIG. 2 may involve prefetching data, such as attribute data, across at least two different data streams rather than within the same data stream. As explained above, this may improve the efficiency of the prefetch process.

In examples such as FIG. 2, the data stream to which the first attribute data and the second attribute data belong may be identified directly, for example based on address data indicative of an address of the first attribute data and the second attribute data in memory. For example, attribute data for a particular vertex may be uniquely identified by two indices: a first index indicating the vertex, and a second index indicating the attribute. These indices may be considered to be a proxy for an address of the attribute data for a given vertex, which allow the address to be calculated. The calculation of the address for attribute data for a vertex is described further below with reference to FIG. 11.

The second attribute data can be fetched from the storage along with the first attribute data, for example in the same processing step or during the same or overlapping clock cycles. Alternatively, the second attribute data may be fetched from the storage during one or more clock cycles subsequent to the clock cycles used for fetching the first attribute data.

Figure 3:
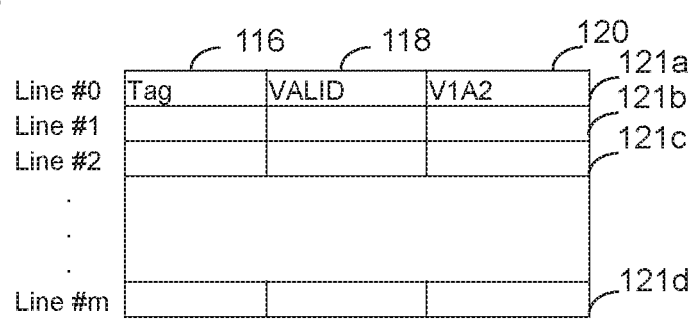
FIG. 3 illustrates schematically an example of a buffer for use with the methods described herein.

An example of a buffer 114 for use with the methods described herein is shown schematically in FIG. 3. The buffer 114 in FIG. 3 includes rows or lines 0, 1, 2 . . . m, which are indicated as line #0, line #1, line #2 . . . line # m in FIG. 3 and labelled with the reference numerals 121a, 121b, 121c, 121d respectively. Each line of the buffer 114 includes a first storage area 116, a second storage area 118 and a third storage area 120. The first storage area 116 stores a tag associated with the data stored in that line of the buffer. The tag for example represents at least part of the address of the data in the storage. The second storage area 118 stores a count, which indicates whether the line of the buffer 114 is in use. For example, the count may indicate whether valid data has been stored in the line of the buffer 114. The count may thus be set to INVALID before the line of the buffer 114 is filled, and to VALID afterwards. The third storage area 120 stores the data itself, which is for example fetched from the storage. In the example of FIG. 3, the second attribute data for the first vertex has been stored in line #0 of the buffer 114. Thus, the first storage area 116 stores Tag, which represents the tag associated with the second attribute data, the count of the second storage area 118 is set to VALID, and the third storage area 120 stores what is denoted as V1V2, which in this example is the second attribute data itself.

In examples, the graphics processing system includes a plurality of buffers such as the buffer 114 of FIG. 3. An example of prefetching attribute data to a buffer of a plurality of buffers is illustrated schematically in FIG. 4.

Figure 4:
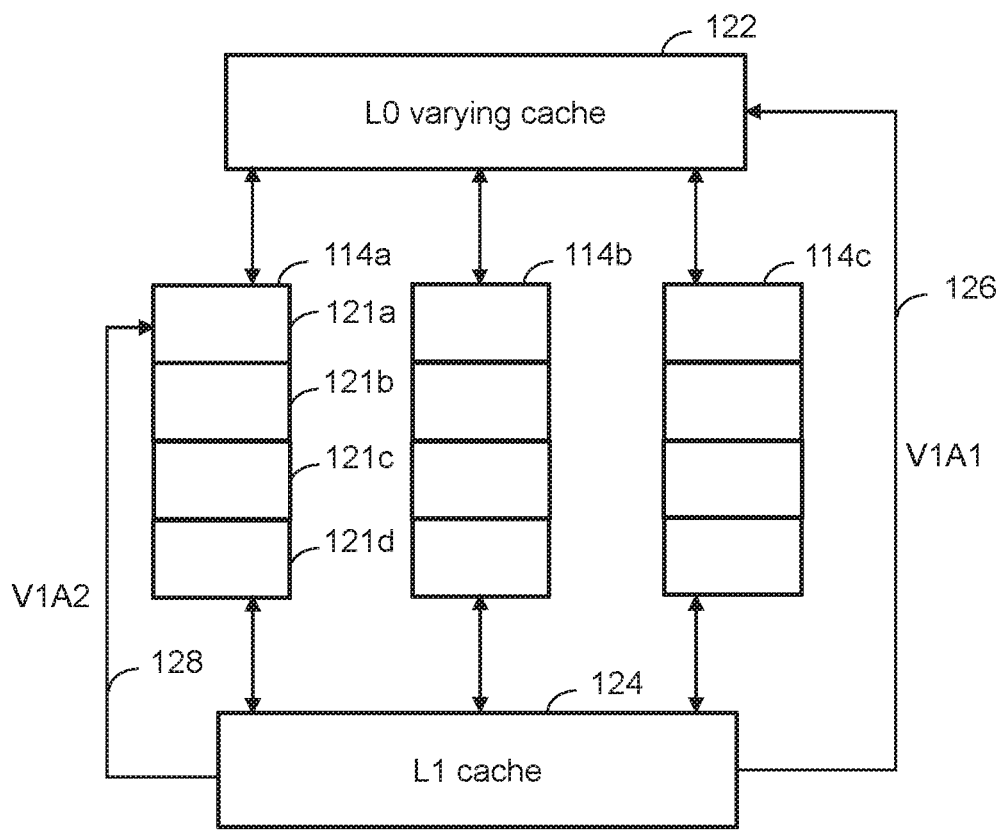
FIG. 4 illustrates schematically prefetching of attribute data according to examples.

In FIG. 4, there is a request for first attribute data of a first vertex of at least one graphics primitive from an L0 varying cache 122. The L0 varying cache 122 is an example of a cache for use with a graphics processing system and other caches are possible in other examples, such as other Random Access Memory (RAM) caches. The L0 varying cache 122 may be a relatively small cache for storing attribute data for use by an interpolator for interpolation of the attribute data.

In the example of FIG. 4, the first attribute data is absent from the L0 varying cache 122. Thus, in this example, the first attribute data is fetched from the storage, which in this example is a L1 cache 124. However, in other examples, the first attribute data may be fetched from other storage, such as lower-level storage that is larger than the L1 cache or that is further from the graphics processor than the L1 cache. The fetching of the first attribute data (denoted V1A1 in FIG. 4) is shown schematically in FIG. 4 via arrow 126.

In this case, the method also involves identifying the first vertex (which is the vertex the first attribute data is associated with). In response to identifying the first vertex, a prefetch process is carried out. In this example, before performing the prefetch process, it is determined that the first attribute corresponds to a predefined master attribute. In other words, the prefetch process may solely be performed where it is determined that an attribute retrieved from the storage (for example in response to a cache miss) is the master attribute. In these cases, the prefetch process may not be performed if an attribute retrieved from the storage is not the master attribute. Thus, by appropriately selecting an attribute as a master attribute, the rate at which the prefetch process is performed can be controlled. For example, the master attribute may be an attribute which it is anticipated that is likely to be retrieved frequently from the storage, which will therefore trigger sufficiently frequent performance of the prefetch process.

As explained above, each attribute may be considered to correspond to a different data stream. Thus, the master attribute may also be considered to correspond to a master data stream.

In some cases, though, the prefetch process may be performed without first checking to see whether an attribute is the master attribute or not. In these cases, however, the prefetch process may be carried out at a relatively high rate. This may therefore lead to more data being prefetched than is needed or requested by the cache in the future, which can reduce the efficiency of the method. As the skilled person will appreciate, though, this may be depend on the precise details of the graphics processing pipeline the method is used with and in some cases it may be appropriate to perform the prefetch process without determining that the attribute is the master attribute.

In examples such as that of FIG. 4, the graphics processing pipeline comprises a plurality of buffers. In FIG. 4, there are three buffers 114a, 114b, 114c, each of which has the same structure as the buffer 114 shown in FIG. 3 (although more or fewer buffers are possible in other examples). Details of the internal structure of the buffers 114a, 114b, 114c are omitted in FIG. 4, for clarity. Lines 0, 2, 3 and m (with reference numerals 121a, 121b, 121c, 121d) of the first buffer 114a are labelled in FIG. 4. Although reference numerals for lines of the second and third buffers 114b, 114c are omitted in FIG. 4, it is to be appreciated that in this example the second and third buffers 114b, 114c have the same structure as the first buffer 114a.

In FIG. 4, the second attribute data V1A2 of the first vertex is transferred from the L1 cache 124 to the first line 121a of the first buffer 114a. This is shown schematically in FIG. 4 with the reference numeral 128. In examples such as FIG. 4, the buffer in which the second attribute data is stored (in this example the first buffer 114a) may be selected on the basis of an association between the selected buffer and the second attribute. In FIG. 4, the association between the first buffer 114a and the second attribute is for example determined based on an index associated with the second attribute and an index associated with the first buffer 114a. For example, the method may include selecting a buffer of the plurality of buffers associated with a particular index and using the selected buffer to store the second attribute data.

In some cases, the method may include determining that the data to be prefetched is to be representative of the second attribute on the basis that there is an association between the selected buffer and the second attribute. For example, there may be an assessment of which attribute each of the buffers is associated with. The attribute data for each buffer with an association may then be obtained from the storage. Thus, if there is an association between the first buffer 114a and the second attribute, the second attribute data may be prefetched. In contrast, if there is an association between the first buffer 114a and a different attribute than the second attribute, such as a third attribute, third attribute data may be fetched from the storage instead of the second attribute data. This avoids attempting to prefetch attribute data for attributes that may not be needed in future. For example, the association between a buffer and an attribute may indicate that the attribute data for that attribute is likely to be needed at a subsequent time and that it is therefore worth prefetching the attribute data from the storage. Conversely, if an attribute is rarely or infrequently used, it may not be associated with a buffer. In such cases, this attribute may not be prefetched as part of the prefetch process, to avoid unnecessarily prefetching attribute data that is unlikely to be needed.

Each buffer may be associated with solely one attribute at a given time. For example, with the selected buffer associated with the second attribute, the selected buffer may include solely data representative of the second attribute for vertices of the plurality of vertices. Thus, each buffer may therefore be associated with solely one data stream (for example, where each attribute corresponds to a different data stream), and may thus include solely data from that particular data stream. However, in some examples, the association between buffers and attributes or data streams may vary over time, as will be described further below.

Figure 5:
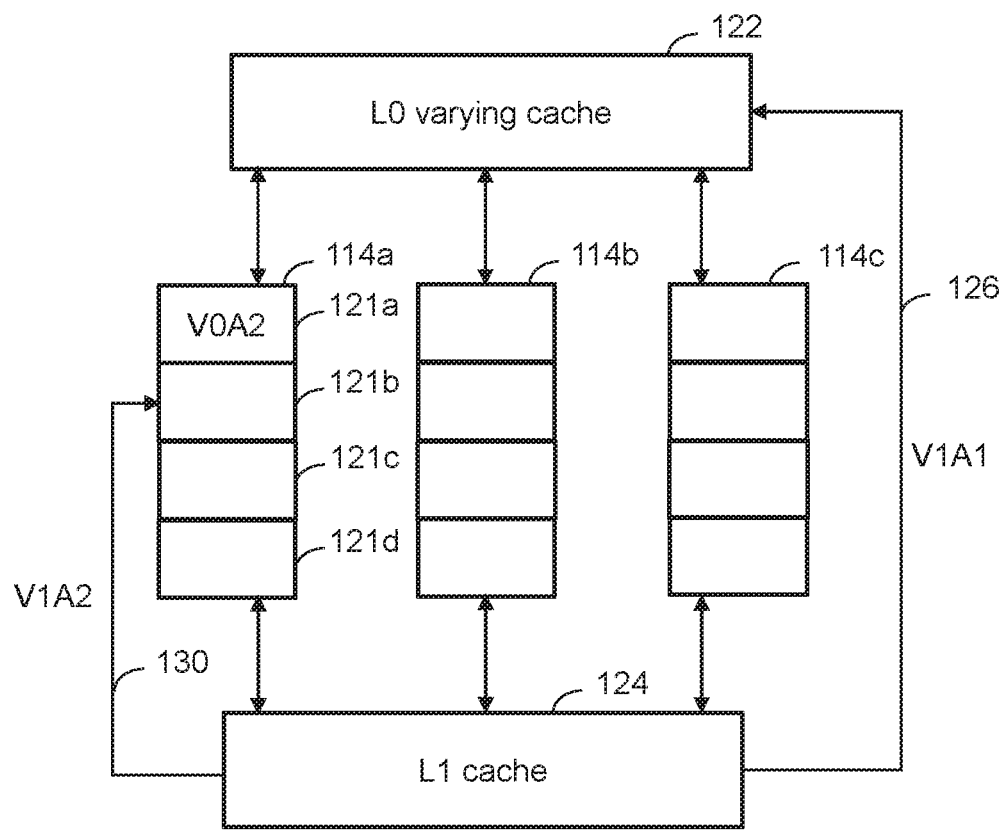
FIG. 5 illustrates schematically prefetching of attribute data according to further examples.

FIG. 5 illustrates schematically a further example of prefetching of attribute data, which illustrates an example of forming an association between an attribute and a buffer. Features of FIG. 5 similar to corresponding features of FIG. 4 are labelled with the same reference numerals; corresponding descriptions are to be taken to apply.

In FIG. 5, the buffer selected to store the second attribute data (in this example, the first buffer 114a) includes data representative of the second attribute for at least one vertex of the plurality of vertices other than the first vertex. On the basis of determining that the selected buffer includes the data representative of the second attribute, the method of FIG. 5 further includes forming the association between the selected buffer and the second attribute data. For example, an initial piece of second attribute data (representing a vertex other than the first vertex) may be stored in any buffer of the plurality of buffers, such as an empty buffer. In this example, all the buffers were empty prior to retrieval of the initial piece of second attribute data. Thus, the second attribute data for the zeroth vertex (labelled as V0A2) is stored in the first line 121a of the first buffer 114a.

At this stage, the first buffer 114a is not associated with the second attribute (or another attribute). However, by storing the second attribute data for the zeroth vertex V0A2 in the first buffer 114a, an association between the first buffer 114a and the second attribute data is formed, so that subsequent pieces of second attribute data, for example representative of second attributes of vertices other than the zeroth vertex, are stored in the first buffer 114a rather than a different buffer. Thus, arrow 130 illustrates the second attribute data for the first vertex (labelled as V1A2) being stored in the second line 121b of the first buffer 114a. Note, in this case, the second attribute data for the first vertex is stored in a different line than the second attribute data for the zeroth vertex so as to avoid overwriting the second attribute data for the zeroth vertex (and as there is still space in the first buffer 114a). However, if the buffer associated with the second attribute is full when the second attribute data associated with the first vertex V1A2 is retrieved from the L1 cache 124, an entry from this buffer (e.g. the first buffer 114a) may be removed or evicted from the first buffer 114a. In these cases, for example the least recently used entry (such as the least recently used line of data) may be evicted from the first buffer 114a and each entry may be moved up on one line so that there is space for the second attribute data associated with the first vertex V1A2 to be transferred to the first buffer 114a.

Figure 6:
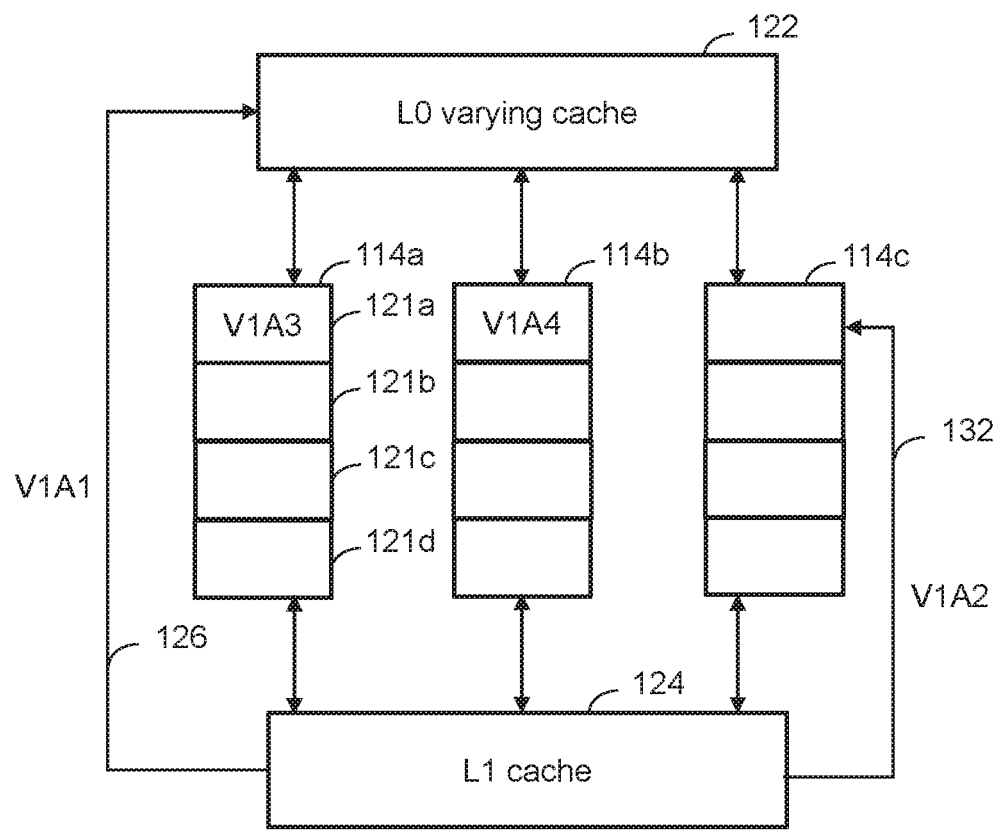
FIG. 6 illustrates schematically prefetching of attribute data according to yet further examples.

FIG. 6 shows an alternative method by which an association may be formed between a buffer and an attribute. Features of FIG. 6 similar to corresponding features of FIGS. 4 and 5 are labelled with the same reference numerals; corresponding descriptions are to be taken to apply.

In FIG. 6, unlike FIGS. 4 and 5, the first buffer 114a is associated with the third attribute and the second buffer 114b is associated with the fourth attribute. In this case, the first buffer 114a includes third attribute data for the first vertex (labelled as V1A3) and the second buffer 114b includes fourth attribute data for the first vertex (labelled as V1A4). However, prior to the transfer of data shown in FIG. 6, none of the buffers include second attribute data. Thus, methods in accordance with FIG. 6 may involve determining that the plurality of buffers do not include data representative of the second attribute for any of the plurality of vertices. In such examples, an empty buffer of the plurality of buffers may be identified and an association may be formed between the empty buffer and the second attribute, with the empty buffer corresponding to the selected buffer. In FIG. 6, as the third buffer 114c is empty, the third buffer 114c may be associated with the second attribute. Hence, the second attribute data of the first vertex V1A2 may be transferred, as shown with arrow 132, from the L1 cache 124 to the third buffer 114c.

Figure 7A:
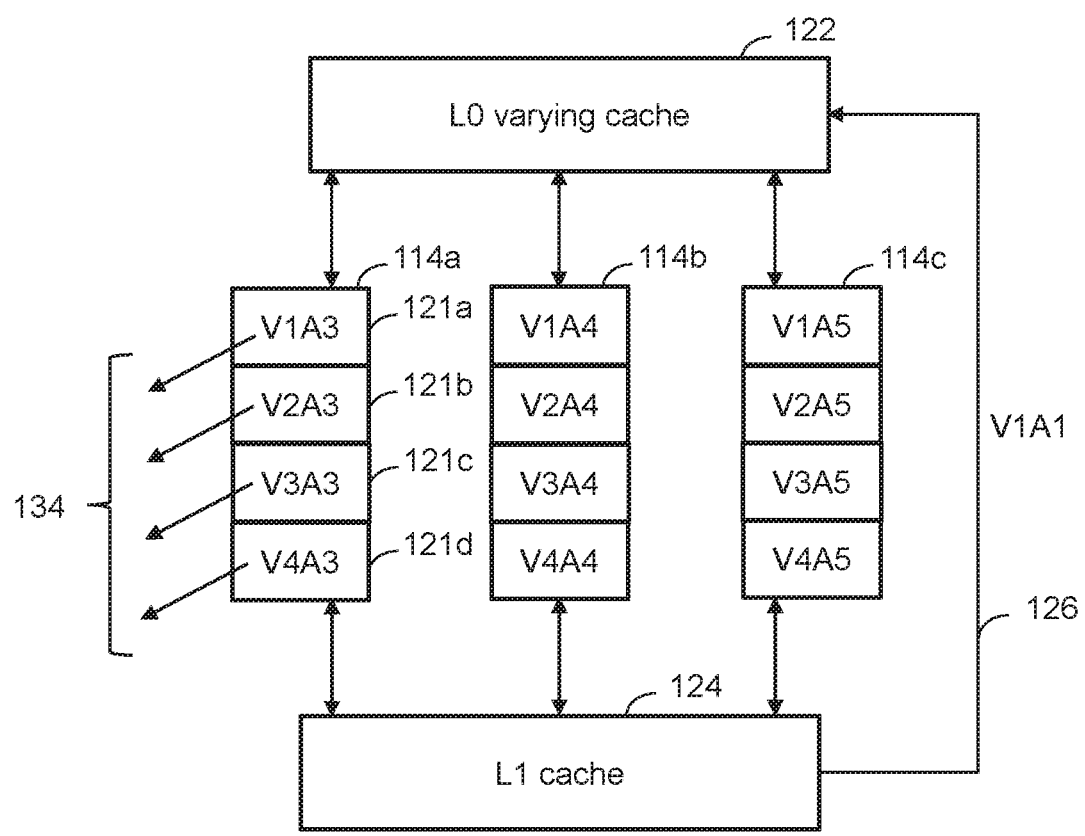
FIGS. 7a and 7b illustrate schematically prefetching of attribute data according to still further examples.
Figure 7B:
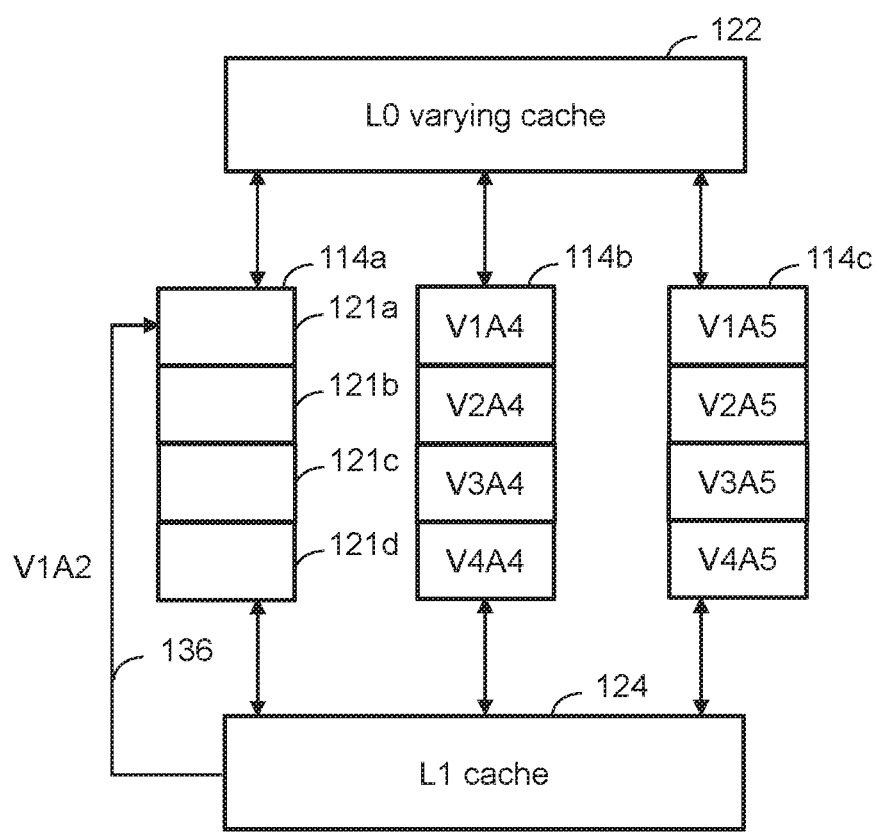

In some cases in which the plurality of buffers do not include data representative of the second attribute for any of the plurality of vertices, the plurality of buffers may not include an empty buffer. FIGS. 7a and 7b illustrate an example of forming an association between a selected buffer and the second attribute in such cases, for use with a method of prefetching attribute data. Features of FIGS. 7a and 7b similar to corresponding features of FIGS. 4, 5 and 6 are labelled with the same reference numerals; corresponding descriptions are to be taken to apply.

In FIG. 7a, there are no empty buffers. In this example, the first buffer 114a is full of third attribute data for first, second, third and fourth vertices, labelled as V1A3, V2A3, V3A3, V4A3 respectively. The second buffer 114b is full of fourth attribute data for first, second, third and fourth vertices, labelled as V1A4, V2A4, V3A4, V4A4 respectively. The third buffer 114c is full of fifth attribute data for first, second, third and fourth vertices, labelled as V1A5, V2A5, V3A5, V4A5 respectively.

In this example, data is evicted from one of the plurality of buffers. In this case, the data of the first buffer 114a is evicted or removed from the first buffer 114a (shown schematically with the arrows 134). This leaves the first buffer 114a empty, as shown in FIG. 7b. Then, an association between the buffer from which data has been evicted and the second attribute is formed. In this case, an association is formed between the first buffer 114a and the second attribute and the second attribute data of the first vertex V1A2 is transferred from the L1 cache 124 to the first buffer 114a.

In examples such as FIG. 7, the forming the association may include changing an association between one of the plurality of buffers and a third attribute different from the first and second attributes to the association between the one of the plurality of buffers and the second attribute. This can be seen by comparing FIG. 7a and FIG. 7b. In FIG. 7a, the first buffer 114a is associated with the third attribute and therefore includes third attribute data for various vertices. In contrast, in FIG. 7b, the first buffer 114a is instead associated with the second attribute and therefore includes second attribute data for the first vertex V1A2. The association of the first buffer 114a has therefore changed between FIG. 7a and FIG. 7b.

The buffer that data is evicted from, that for example has an association changed to an association with the second attribute, may be selected using various different methods. For example, the buffer the data is evicted from may be a least recently used buffer.

Figure 8:
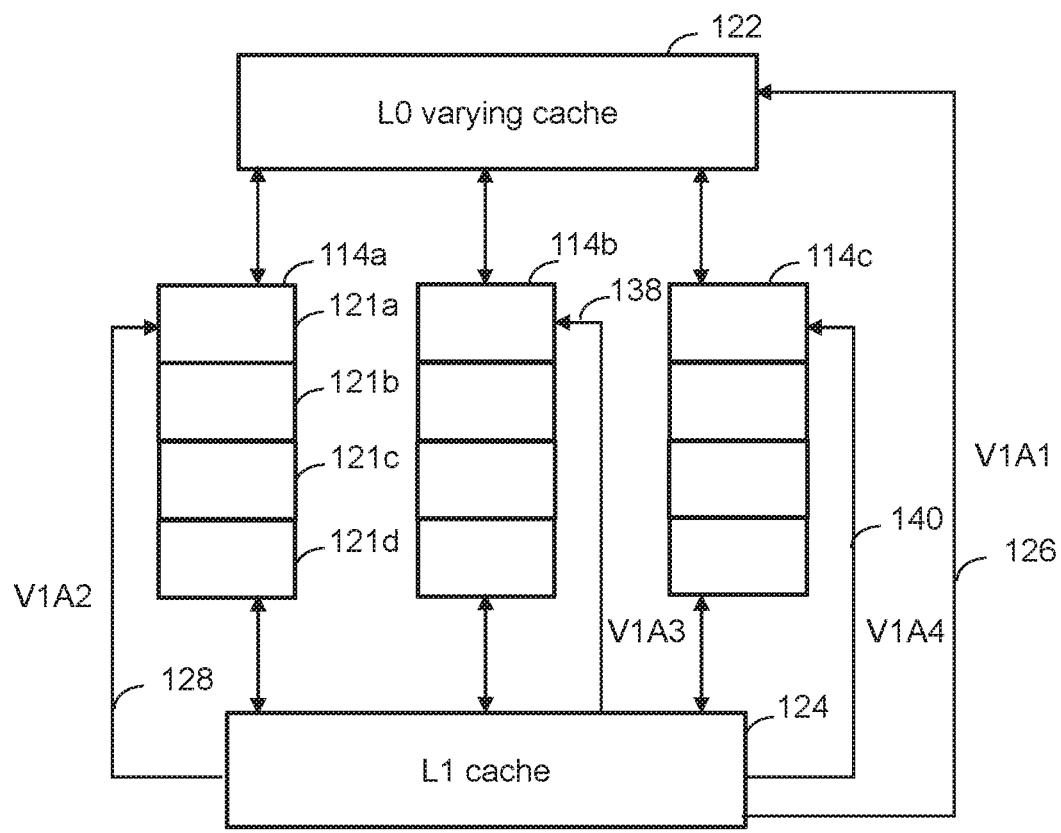
FIG. 8 illustrates schematically prefetching of attribute data according to other examples.

FIG. 8 illustrates schematically a further example of prefetching of attribute data. Features of FIG. 8 similar to corresponding features of FIGS. 4, 5, 6 and 7 are labelled with the same reference numerals; corresponding descriptions are to be taken to apply.

In FIG. 8, the prefetch process includes prefetching the second attribute data for the first vertex V1A2 and storing it in the first buffer 114a, as shown via the arrow 128. However, in the example of FIG. 8, the prefetch process also includes prefetching third attribute data for the first vertex, denoted as V1A3 in FIG. 8, from the L1 cache 124. The third attribute data is stored in the second buffer 114b, as shown in FIG. 8 by the arrow 128. The second buffer 114b is a different, for example separate or distinct, buffer from the first buffer 114a. The third attribute data is representative of a third attribute of the first vertex and the third attribute is different from the first and second attributes.

The prefetch process in the example of FIG. 8 also includes prefetching fourth attribute data for the first vertex, denoted as V1A4 in FIG. 8, from the L1 cache 124. The fourth attribute data is stored in the third buffer 114c, as shown with the arrow 140 in FIG. 8. The fourth attribute data is representative of a fourth attribute of the first vertex, different from the first, second and third attributes.

Thus, in examples such as FIG. 8, the method of prefetching attribute data may include fetching attribute data for the first vertex for a plurality of attributes other than the attribute retrieved from the L1 cache 124 and stored in the L0 varying cache 122, for example for other attributes than the initial attribute requested from the L0 varying cache 122. This may further improve the efficiency of the prefetch process, for similar reasons as explained above for FIG. 2, as the use of the first attribute data for the first vertex as part of a graphics processing pipeline may indicate that attribute data for the first vertex for other attributes than the first attribute may also be needed subsequently.

As each attribute may correspond to a different data stream, methods such as FIG. 8 may involve prefetching data across a number of different data streams than that from which data is fetched from the storage.

In the example of FIG. 8, the first buffer 114a has an association with the second attribute, the second buffer 114b has an association with the third attribute and the third buffer 114c has an association with the fourth attribute. Hence, the second attribute data is stored in the first buffer 114a, the third attribute data is stored in the second buffer 114b and the fourth attribute data is stored in the third buffer 114c. In examples, attribute data for attributes of the first vertex other than the first attribute (or another attribute allocated as the master attribute) may only be stored in a respective buffer where there is a buffer with an association with that respective attribute. In other words, if the first vertex has a further attribute that is not associated with a buffer, the further attribute data for the first vertex may not be prefetched from the L1 cache 124 as part of the prefetch process.

As will be appreciated, the forming of the associations between buffers and attributes that may be present in examples in accordance with FIG. 8 may be performed as described above with reference to FIGS. 4 to 7.

Figure 9:
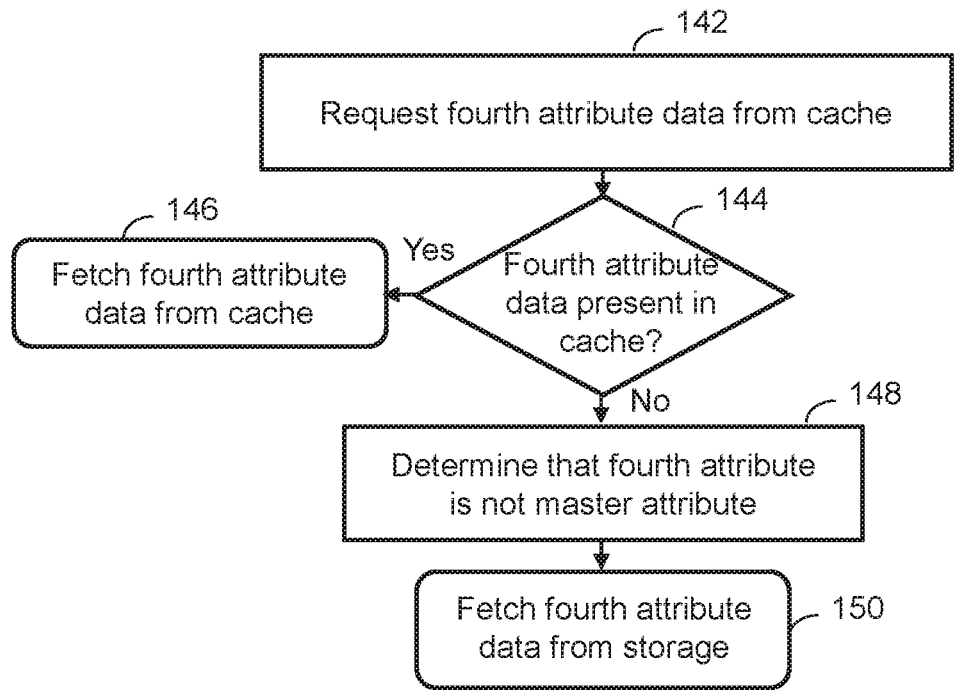
FIG. 9 is a flow diagram illustrating an example of fetching of attribute data.

FIG. 9 is a flow diagram illustrating an example method of prefetching attribute data, which may be combined with the examples described above with reference to FIGS. 4 to 8. At block 142 of FIG. 9, fourth attribute data is requested from the cache. The fourth attribute data is for example representative of a fourth attribute of the first vertex, which is typically different from the first, second and third attributes of the first vertex. At block 144 of FIG. 9, the method involves determining whether the fourth attribute data is present in the cache. If the fourth attribute data is located in the cache, the method involves fetching the fourth attribute data from the cache at block 146. The fourth attribute data may then be processed further as part of the graphics processing pipeline.

If, however, the fourth attribute data is not present in the cache, the method of FIG. 9 involves determining that the fourth attribute data does not correspond to the predefined master attribute (described above), at block 148. Subsequently, the method of FIG. 9 involves retrieving, at block 150, fourth attribute data from the storage without prefetching data representative of attributes of the first vertex other than the fourth attribute from the storage. The fourth attribute data retrieved from the storage may be stored in the cache without being stored initially in a buffer of the at least one buffer, or the fourth attribute data may be transferred from the storage to the cache via a buffer. Thus, in the method of FIG. 9, if it is determined that attribute data does not relate to the predefined master attribute, the attribute data may be fetched without performing a prefetch process. This can for example be used to maintain the rate at which the prefetch process is performed at an acceptable or manageable rate, without overloading the system with a large or excessive number of prefetch requests.

Figure 10:
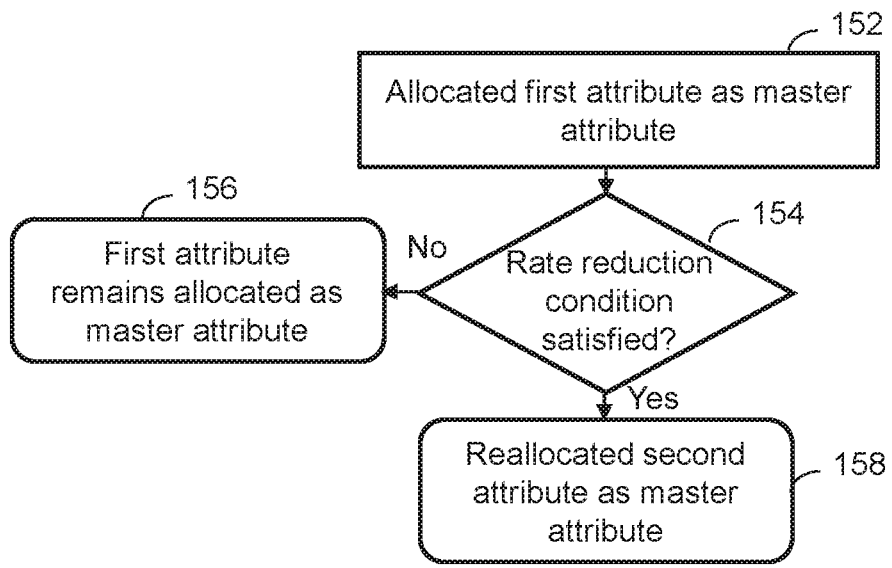
FIG. 10 is a flow diagram illustrating an example of allocation of attributes as a predefined master attribute.

FIG. 10 is a flow diagram illustrating an example of allocation of attributes as a predefined master attribute. In FIG. 10, the first attribute is allocated as the predefined master attribute at block 152. The first attribute may be allocated as the predefined master attribute as a result of the first attribute being the first attribute of the first vertex to be requested by the cache. Alternatively, the first attribute may be allocated as the predefined master attribute based on properties of the first attribute itself, such as an expected rate at which the first attribute is to be used as part of the graphics processing pipeline.

At block 154, a determination is made as to whether a rate reduction condition is satisfied. If not, the first attribute remains allocated as the predefined master attribute, as shown at block 156 of FIG. 10. However, if it is determined that the rate reduction condition is satisfied, the second attribute is reallocated as the predefined master attribute at block 158. In other words, FIG. 10 illustrates a method in which the first attribute is first allocated as the predefined master attribute and, subsequently, the second attribute is reallocated as the predefined master attribute.

In examples, the method of FIG. 10 involves determining that a reduction in a rate at which attribute data representative of the first attribute is retrieved from the storage satisfies a rate reduction condition, and reallocating the second attribute as the predefined master attribute if this condition is satisfied. For example, at a certain point in time, all the relevant first attribute data may have been retrieved from the storage and stored in the cache. In such cases, there may be fewer or no requests for attribute data representative of the first attribute from the storage. In such cases, there may therefore be fewer or no incidences in which an attribute corresponding to the predefined master attribute (in this case, the first attribute) is retrieved from the storage, leading to fewer or no incidences of performing the prefetch process. This may mean that the latency of the memory system is no longer hidden, as little or no data is prefetched.

To counteract this, the rate at which the attribute data representative of the predefined master attribute (in this case, the first attribute) is retrieved from the storage may be monitored. For example, the number of retrievals or requests for the attribute data representative of the predefined master attribute from the storage for a fixed or predetermined period of time may be counted and compared with the number of retrievals or requests for attribute data representative of other attributes (which typically do not trigger performance of the prefetch process). For example, a counter may be incremented for each request for the attribute data representative of the predefined master attribute and decremented for each request for the attribute data representative of other attributes. Based on this, the reduction in the rate at which the attribute data representative of the first attribute (in this case, the predefined master attribute) may be calculated and compared with the rate reduction condition.

In other examples, a comparison may be made between the number of cache misses associated with the predefined master attribute and the number of times the prefetch process is performed, to determine whether the reduction in the rate at which the attribute data representative of the first attribute (in this case, the predefined master attribute) satisfies the rate reduction condition. For example, if all or most of the attribute data representative of the first attribute has been fetched from the storage and is stored in the cache, there will rarely be a cache miss associated with the first attribute. In such cases, the predefined master attribute may be reallocated to a different attribute, such as the second attribute, which may be missing from the cache more frequently and which may therefore trigger more frequent performance of the prefetch process.

Figure 11:
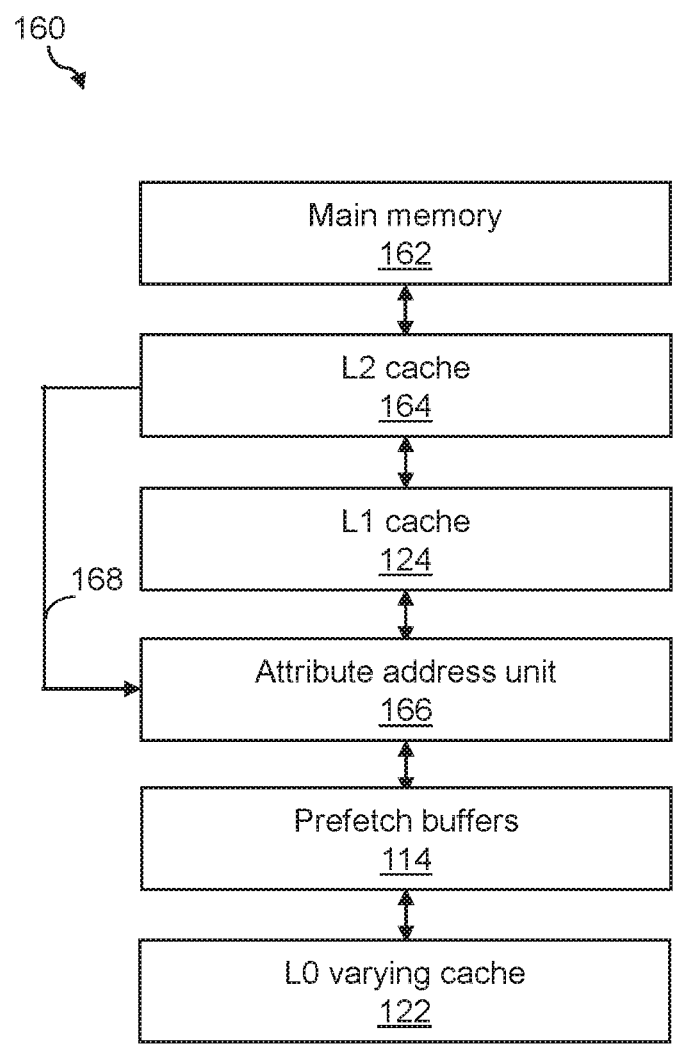
FIG. 11 is a block diagram illustrating schematically components of a storage system according to examples.

An example of components of a storage system 160 for use with the methods described herein is illustrated schematically in FIG. 11. The storage system 160 includes a main memory 162. The main memory 162 is for example primary or main storage of a host system running a graphics processing pipeline. The main memory 162 may be or include at least one of volatile memory, such as a Random Access Memory (RAM), for example Static RAM (SRAM) or Dynamic RAM (DRAM) and non-volatile memory, such as Read Only Memory (ROM) or a solid state drive (SSD) such as Flash memory. The main memory 162 in examples may include further storage devices, for example magnetic, optical or tape media, compact disc (CD), digital versatile disc (DVD) or other data storage media. The main memory 162 may be removable or non-removable from the graphics processing system. Typically, although the main memory 162 is in data communication with other components of the storage system 160, the main memory 162 is located outside of or externally to a graphics processor for use with the graphics processing pipeline. The main memory 162 may store attribute data for each of the vertices of the graphics primitives generated during the graphics processing pipeline.

The main memory 162 is in communication with a L2 cache 164. In this example, the L2 cache 164 is in communication with the L1 cache 124 described above with reference to FIGS. 4 to 8. The L2 cache 164 and the L1 cache 124 are for example a Random Access Memory (RAM) or an embedded Dynamic Random Access Memory (eDRAM), which may be integrated on the same chip as other components of the graphics processor. While in some cases, the L2 cache 164 and/or the L1 cache 124 may be dedicated to the graphics processor, in other cases, the L2 cache 164 and/or the L1 cache 124 may be part of storage that is shared with other processors. For example, the L2 cache 164 and/or the L1 cache 124 may form part of a main system RAM that is also accessible to a host central processor or central processing unit (CPU). In such cases, the L2 cache 164 and/or the L1 cache 124 may be considered to be the part of shared storage that is accessible or visible to the graphics processor. In the example of FIG. 11, though, the graphics processor comprises the L2 cache 164, with the L2 cache 164 located outside of the GPU core of the graphics processor. In contrast, the L1 cache 124 is located within the GPU core of the graphics processor.

The L1 cache 124 is in communication with an attribute address unit 166, which for example translates indices associated with a vertex and an attribute to an address in storage, so that attribute data missing from the prefetch buffers 114 and/or the L0 varying cache 122 can be accessed from the appropriate address in the storage (such as an address of the L1 cache 124, the L2 cache 164 or the main memory 162). The attribute address unit 166 in this example receives descriptors 168 from the L2 cache 164, which can be used in conjunction with the attribute and vertex indices to calculate the address of attribute data for a given attribute and vertex. For example, the first attribute for vertices of the plurality of vertices may be associated with a first attribute index, and the first vertex may be associated with first vertex index. Thus, the attribute for each vertex may be uniquely identified by the attribute index and the vertex index, allowing the attribute for a particular vertex to be located in the storage.

Figure 12:
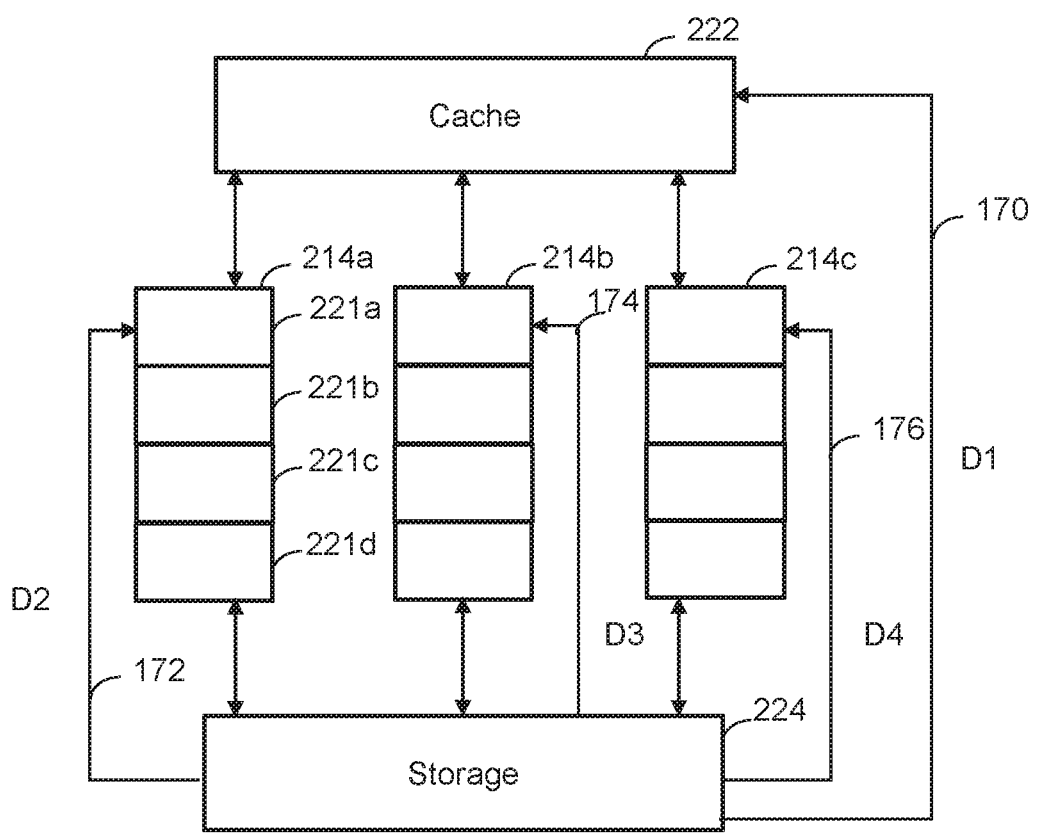
FIG. 12 illustrates schematically prefetching of data according to examples.

The examples above have been described in the context of a graphics processing pipeline. However, the concepts may also be applied to other data processing systems. FIG. 12 illustrates schematically a method of prefetching data according to examples. While the data of FIG. 12 may be attribute data for use in a graphics processing pipeline, the data may be other data than this, for use in other data processing systems. Features of FIG. 12 similar to corresponding features of FIGS. 4 to 8 are labelled with the same reference numeral but incremented by 100; corresponding descriptions are to be taken to apply.

Example methods in accordance with FIG. 12 involve prefetching data from storage 224 for a data processing system including a cache 222 and at least one buffer (in this example a first buffer 214a, a second buffer 214b and a third buffer 214c) to which data is prefetched from the storage 224 and from which data is made available for storing in the cache 222. Such methods for example include retrieving first data D1 from the storage 224 (as shown in FIG. 12 via arrow 170). In response to this retrieving of the first data, a prefetch process is performed. The prefetch process includes prefetching second data D2 from the storage 224 and storing the second data D2 in the first buffer 214a (shown via arrow 172 in FIG. 12) and prefetching third data D3 from the storage 224 and storing the third data D3 in the second buffer 214b (shown via arrow 174 in FIG. 12). In the example of FIG. 12, the prefetch process also includes prefetching fourth data D4 from the storage 224 and storing the fourth data D4 in the third buffer 214c. However, the number of different pieces of data that are prefetched and stored may depend on the nature of the data or the data processing system and is not particularly limited.

In examples such as FIG. 12, the first data may belong to a first data stream, the second data may belong to a second data stream, different from the first data stream, and the third data may belong to a third data stream, different from the first and second data streams. In examples such as this, the prefetch process may involve selecting the first buffer 214a from a plurality of buffers, for storing the second data, on the basis of an association between the first buffer 214a and the second data stream and selecting the second buffer 214b from the plurality of buffers, for storing the third data, on the basis of an association between the second buffer 214b and the third data stream.

For example, the method may include identifying that the second data belongs to the second data stream based on address data of the second data indicative of an address of the second data in the storage 224 and/or identifying that the third data belongs to the third data stream based on address data of the third data indicative of an address of the third data in the storage. The address data for example represents a first portion of the address of the second or third data. In other examples, though, the address data may be a proxy for the address of the second or third data. In such cases, the address data may not directly indicate the address of the second or third data but may instead allow the address of the second or third data to be calculated or determined.

As described above with reference to FIGS. 4 to 8, the method of FIG. 12 may involve, before performing the prefetch process, determining that the first data belongs to a predefined master data stream. This is similar to the determination of FIGS. 4 to 8 that the first attribute data is a predefined master attribute. Similarly to FIG. 9, the method of FIG. 12 may involve determining that fourth data belonging to a fourth data stream does not belong to the predefined master stream and retrieving the fourth data from the storage 224 without prefetching further data from the storage 224. Furthermore, the first data stream may be allocated as the predefined master data stream and a different data stream than the first data stream may be reallocated as the predefined master data stream similarly to the allocation of the first attribute as the predefined master attribute and the reallocation of the second attribute as the predefined master attribute described with reference to FIG. 10.

Although the data of FIG. 12 may be other than attribute data, in other cases, the first data may be representative of a first attribute associated with a first vertex of a graphics primitive, the second data may be representative of a second attribute associated with the first vertex, the second attribute different from the first attribute, and the third data may be representative of a third attribute associated with the first vertex, the third attribute different from the first and second attributes.

Further examples relate to a data processing system including a storage, a cache, a plurality of buffers for storing data prefetched from the storage and from which data is made available for storing in the cache and processor circuitry operable to implement any of the methods described herein. The data processing system may for example include components of the storage system 160 illustrated in FIG. 11. For example, the data processing system may be a graphics processing system and the processor circuitry may include a graphics processor. Where the first data is representative of a first attribute of a first vertex of a graphics processor, the second data is representative of a second attribute of the first vertex and the third data is representative of a third attribute of the first vertex, the plurality of buffers may include n buffers and the first vertex may have m attributes including the first, second and third attributes, with m larger than n.

The above examples are to be understood as illustrative examples. Further examples are envisaged. For example, although in the above examples the first attribute data and the first data are retrieved from the storage and stored in the cache without being stored in intermediate storage, in other examples one or both of the first attribute data or the first data may be stored in intermediate storage, such as for example one of the plurality of buffers, before being transferred to the cache.

In the examples above, attribute data is prefetched solely for the first vertex. In other examples, though, the prefetching process may involve prefetching attribute data for a plurality of vertices including the first vertex, which may be a sequential or consecutive series of vertices (in vertex index order) or a non-sequential or non-consecutive set of vertices.

Although the examples described include three buffers, and the prefetch process includes prefetching data to one or three of these buffers, in other examples the plurality of buffers may include more or fewer than three buffers. Furthermore, the prefetch process may involve prefetching data to any number of the plurality of buffers. For example, the prefetch process may involve prefetching data to each of the buffers that is associated with an attribute or a data stream, which may vary over time.

It should be noted that the FIGS. are merely schematic, and that, for example, in practice illustrated functional units in the same FIG. may share significant hardware circuits, even though they may be shown schematically as separate units. It will also be appreciated that each of the stages, elements and units, etc., of the FIGS. may be implemented as desired and will accordingly include, for example, appropriate circuitry and/or processing logic, etc., for performing the associated operation and functions. For example, any of the methods described herein may be implemented using software, hardware or any combination of software or hardware.

It is to be understood that any feature described in relation to any one example may be used alone, or in combination with other features described, and may also be used in combination with one or more features of any other of the examples, or any combination of any other of the examples. Furthermore, equivalents and modifications not described above may also be employed without departing from the scope of the accompanying claims.

What is claimed is:

1. A method of prefetching attribute data from storage for a graphics processing pipeline comprising a cache, and at least one buffer to which data is prefetched from the storage and from which data is made available for storing in the cache, the method comprising:
   retrieving first attribute data from the storage, the first attribute data representative of a first attribute of a first vertex of a plurality of vertices of at least one graphics primitive;
   identifying the first vertex; and
   in response to the identifying, performing a prefetch process comprising:
      prefetching second attribute data from the storage, the second attribute data representative of a second attribute of the first vertex, the second attribute being different from the first attribute; and
      storing the second attribute data in a buffer of the at least one buffer.

2. The method according to claim 1, wherein the graphics processing pipeline comprises a plurality of buffers and in which the buffer in which the second attribute data is stored is selected on the basis of an association between the selected buffer and the second attribute.

3. The method according to claim 2, comprising:
determining that the selected buffer comprises data representative of the second attribute for at least one vertex of the plurality of vertices other than the first vertex; and
on the basis of the determining, forming the association between the selected buffer and the second attribute.

4. The method according to claim 2, comprising:
determining that the plurality of buffers do not comprise data representative of the second attribute for any of the plurality of vertices;
identifying an empty buffer of the plurality of buffers; and
forming the association between the empty buffer and the second attribute, the empty buffer corresponding to the selected buffer.

5. The method according to claim 2, comprising:
determining that the plurality of buffers do not comprise data representative of the second attribute for any of the plurality of vertices;
determining that the plurality of buffers do not comprise an empty buffer;
evicting data from one of the plurality of buffers; and
forming the association between the one of the plurality of buffers and the second attribute, the one of the plurality of buffers corresponding to the selected buffer.

6. The method according to claim 5, wherein the forming the association comprises changing an association between the one of the plurality of buffers and a third attribute different from the first attribute and the second attribute to the association between the one of the plurality of buffers and the second attribute.

7. The method according to claim 5, wherein the one of the plurality of buffers is a least recently used buffer.

8. The method according to claim 2, wherein with the selected buffer associated with the second attribute, the selected buffer comprises solely data representative of the second attribute for vertices of the plurality of vertices.

9. The method according to claim 1, wherein:
the buffer in which the second attribute data is stored is a first buffer; and
the prefetch process comprises:
prefetching third attribute data from the storage, the third attribute data representative of a third attribute of the first vertex, the third attribute being different from the first attribute and the second attribute; and
storing the third attribute data in a second buffer different from the first buffer.

10. The method according to claim 1, comprising, before performing the prefetch process, determining that the first attribute corresponds to a predefined master attribute.

11. The method according to claim 10, comprising:
determining that fourth attribute data representative of a fourth attribute of the first vertex does not correspond to the predefined master attribute; and
retrieving the fourth attribute data from the storage without prefetching data representative of attributes of the first vertex other than the fourth attribute from the storage.

12. The method according to claim 10, comprising:
allocating the first attribute as the predefined master attribute; and
subsequently, reallocating the second attribute as the predefined master attribute.

13. A method of prefetching data from storage for a data processing system comprising a cache, and a plurality of buffers to which data is prefetched from the storage and from which data is made available for storing in the cache, the plurality of buffers comprising a first buffer and a second buffer different from the first buffer, the method comprising:
retrieving first data from the storage, the first data belonging to a first data stream; and
in response to the retrieving, performing a prefetch process comprising:
prefetching second data from the storage, the second data belonging to a second data stream, different from the first data stream;
storing the second data in the first buffer;
prefetching third data from the storage, the third data belonging to a third data stream, different from the first data stream and the second data stream;
storing the third data in the second buffer;
selecting the first buffer from the plurality of buffers on the basis of an association between the first buffer and the second data stream; and
selecting the second buffer from the plurality of buffers on the basis of an association between the second buffer and the third data stream.

14. The method according to claim 13, comprising at least one of:
identifying that the second data belongs to the second data stream based on address data of the second data indicative of an address of the second data in the storage; or
identifying that the third data belongs to the third data stream based on address data of the third data indicative of an address of the third data in the storage.

15. The method according to claim 13, wherein
the method comprises, before the performing the prefetch process, determining that the first data belongs to a predefined master data stream.

16. The method according to claim 13, wherein:
the first data is representative of a first attribute associated with a first vertex of a graphics primitive;
the second data is representative of a second attribute associated with the first vertex, the second attribute different from the first attribute; and
the third data is representative of a third attribute associated with the first vertex, the third attribute different from the first attribute and the second attribute.

17. A graphics processing system comprising:
storage;
a cache;
a plurality of buffers for storing data prefetched from the storage and from which data is made available for storing in the cache; and
processor circuitry, comprising a graphics processor, operable to:
retrieve first data from the storage, the first data representative of a first attribute of a first vertex of a graphics primitive; and
in response to the retrieving, perform a prefetch process comprising:
prefetching second data from the storage, the second data representative of a second attribute of the first vertex, the second attribute different from the first attribute;
storing the second data in a first buffer of the plurality of buffers;

prefetching third data from the storage, the third data representative of a third attribute of the first vertex, the third attribute different from the first attribute and the second attribute; and storing the third data in a second buffer of the plurality of buffers, the second buffer different from the first buffer.

18. The graphics processing system according to claim 17, wherein:

the plurality of buffers comprises n buffers; and the first vertex has m attributes comprising the first attribute, the second attribute and the third attribute, m being larger than n.

19. The graphics processing system according to claim 17, wherein the processor circuitry is operable to at least one of:

identify that the second data belongs to the second data stream based on address data of the second data indicative of an address of the second data in the storage; or identify that the third data belongs to the third data stream based on address data of the third data indicative of an address of the third data in the storage.

20. The graphics processing system according to claim 17, wherein the processor circuitry is operable to, before the performing the prefetch process, determine that the first data belongs to a predefined master data stream.

* * * * *